(12) United States Patent
Wood

(10) Patent No.: US 10,058,150 B2
(45) Date of Patent: *Aug. 28, 2018

(54) DEVICES, SYSTEMS, AND METHODS FOR COMBINING MOBILITY AND REACHING AIDS

(71) Applicant: Barbara Wood, Whitestown, IN (US)

(72) Inventor: Barbara Wood, Whitestown, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,463

(22) Filed: Oct. 4, 2016

(65) Prior Publication Data

US 2017/0020248 A1 Jan. 26, 2017

Related U.S. Application Data

(63) Continuation-in-part of application No. 14/683,862, filed on Apr. 10, 2015, now Pat. No. 9,456,670.

(60) Provisional application No. 62/036,611, filed on Aug. 12, 2014.

(51) Int. Cl.
| | |
|---|---|
| *A45B 3/00* | (2006.01) |
| *B25J 3/04* | (2006.01) |
| *A61H 3/02* | (2006.01) |
| *B25J 1/04* | (2006.01) |
| *A45B 3/02* | (2006.01) |
| *A45B 9/00* | (2006.01) |
| *A45B 7/00* | (2006.01) |

(52) U.S. Cl.
CPC ............... *A45B 3/00* (2013.01); *A45B 3/02* (2013.01); *A61H 3/02* (2013.01); *B25J 1/04* (2013.01); *A45B 7/005* (2013.01); *A45B 2009/002* (2013.01); *A45B 2009/007* (2013.01); *A61H 2003/0222* (2013.01); *A61H 2201/0192* (2013.01)

(58) Field of Classification Search
CPC ....... A45B 3/00; A45B 9/00; A45B 2009/007; A45B 2009/002; A45B 2009/0254; A45B 2200/1054; E01H 2001/1293; E01H 1/1206; E01H 1/12; B25J 1/04; A61H 3/02; A61H 2003/0222
USPC ...... 135/65–66, 69–70, 78–81; 294/19.3, 104
See application file for complete search history.

(56) References Cited

U.S. PATENT DOCUMENTS

| 2,320,967 A | * | 6/1943 | Dunkelberger | ............ B25J 1/04 294/100 |
| 2,732,242 A | * | 1/1956 | Belford | ..................... E01H 1/12 294/122 |

(Continued)

FOREIGN PATENT DOCUMENTS

EP 07016448.8 B1 4/2011

*Primary Examiner* — Winnie S Yip
(74) *Attorney, Agent, or Firm* — Reichel Stohry LLP; Natalie J. Dean

(57) ABSTRACT

Devices and systems are provided that comprise a reaching apparatus removably coupled with a mobility device such that an individual can couple, uncouple, and/or use the reaching apparatus while concurrently using the mobility device for stability and/or mobility assistance. Related devices, systems, and kits further comprise a sheath for coupling with a mobility device using one or more attachment means, the sheath configured to slidably receive at least part of the reaching apparatus therein. Furthermore, methods for using such devices and systems are provided, providing both retrofit options and otherwise.

18 Claims, 8 Drawing Sheets

(56) References Cited

U.S. PATENT DOCUMENTS

| | | | | |
|---|---|---|---|---|
| 2,802,479 | A * | 8/1957 | Hickman | A45B 9/00 |
| | | | | 135/65 |
| 2,989,334 | A | 6/1961 | Browne | |
| 3,093,402 | A | 6/1963 | Sisson | |
| 3,170,475 | A * | 2/1965 | Forbes | A45B 3/00 |
| | | | | 135/80 |
| 3,465,993 | A * | 9/1969 | Muehlhausen | A63B 55/50 |
| | | | | 135/81 |
| 4,200,322 | A * | 4/1980 | Smith | B25J 1/04 |
| | | | | 294/104 |
| 4,222,597 | A * | 9/1980 | Willis | E01H 1/1206 |
| | | | | 294/1.4 |
| 5,433,234 | A * | 7/1995 | Lapere | A45B 9/04 |
| | | | | 135/66 |
| 6,052,860 | A | 4/2000 | Coxsey | |
| 6,527,321 | B1 | 3/2003 | Kuciauskas | |
| 6,739,637 | B2 * | 5/2004 | Hsu | B25J 1/04 |
| | | | | 294/115 |
| 7,021,324 | B1 * | 4/2006 | Clay | A61H 3/04 |
| | | | | 135/66 |
| 7,281,740 | B1 | 10/2007 | Fields | |
| 8,714,170 | B1 * | 5/2014 | Bonne | A45B 3/00 |
| | | | | 135/66 |
| D738,099 | S * | 9/2015 | Mosteller | D3/10 |
| 2006/0266397 | A1 * | 11/2006 | Berl | A61H 3/02 |
| | | | | 135/70 |
| 2010/0071737 | A1 * | 3/2010 | Gourdine | A45B 11/00 |
| | | | | 135/16 |
| 2012/0060878 | A1 * | 3/2012 | Thiessens | A45B 1/04 |
| | | | | 135/66 |
| 2015/0216272 | A1 * | 8/2015 | Paybins | A45B 3/00 |
| | | | | 135/66 |

* cited by examiner

DEVICES, SYSTEMS, AND METHODS FOR COMBINING MOBILITY AND REACHING AIDS

PRIORITY CLAIM

This application is related to, claims the priority benefit of, and is a U.S. continuation-in-part patent application of U.S. patent application Ser. No. 14/683,862 to Wood, filed Apr. 10, 2015, which is related to and claims the priority benefit of U.S. Provisional Application Ser. No. 62/036,611 to Wood, filed Aug. 12, 2014. The content of the aforementioned applications is hereby expressly incorporated herein by reference in its entirety into this disclosure.

BACKGROUND

Many individuals with a mobility impairment use mobility aids or devices to assist with walking or to otherwise improve their mobility. This is especially true with respect to the elderly population, whose members are often afflicted with medical and/or physical infirmities that affect their ability to walk without aid and/or to bend over to pick up an object lying on the ground. Conventional mobility equipment like canes, crutches, and walkers are widely used to enable individuals with limited mobility to move around without assistance from others. For example, individuals that require additional stability while walking typically use canes and/or walking sticks. When more comprehensive mobility assistance is required—like for patients recuperating from an accident or individuals having limited mobility on account of disability or due to medical conditions for example—devices such as crutches and/or walkers are employed.

While conventional mobility devices provide balance and support to facilitate mobility, they generally offer little assistance with respect to picking up an object that is out of reach, such as off of the ground. For this purpose, conventional reaching aids—such as reachers or grabbers—have been developed to assist people in reaching and retrieving hard-to-reach items without bending over, stooping or stretching. Many reaching aids are also suitable for those individuals who are unable to produce a significant grip.

It is not uncommon for individuals who experience mobility impairment to also have difficulty with bending over to pick up an object that is out of reach. The use of conventional reaching aids in conjunction with conventional mobility aids is problematic as an individual must put aside their mobility device to operate the reaching aid. For example, certain walking canes that include a means for converting the cane into a tool for grasping are known. However, these devices require the individual to stand without the support of the cane in order to use the grasping functionality of the device. Accordingly, conventional devices do not satisfy the combined needs of individuals with respect to providing concurrent stability/mobility and reaching assistance. A device is needed that is capable of effectively providing mobility support while concurrently making a reaching aid conveniently accessible and available to the user. Furthermore, these devices should be durable and easy to manipulate such that a user is not required to exert undue force or dexterity in order to access and/or store the reaching aid functionality thereof.

BRIEF SUMMARY

The present disclosure provides devices and systems that comprise a reaching apparatus removably coupled with a mobility device such that an individual can couple and uncouple the apparatus from the mobility device and/or use the reaching apparatus while concurrently using the mobility device for stability and/or mobility assistance. Also provided are kits for retrofitting the devices and systems hereof and methods for using such exemplary devices and systems.

In at least one exemplary embodiment, a stability assistance system is provided. The stability assistance system comprises a mobility device comprising a shaft and a sheath coupled with and adjacent to the shaft of the mobility device. The sheath comprises an elongated body having an open proximal end, a distal end, and a lumen in communication with at least the one open proximal end. Furthermore, the lumen is configured to slidably receive at least part of a reaching apparatus therein.

The sheath may be integrally formed on the shaft of the mobility device or attached to the shaft using one or more couplers. In at least one embodiment, the shaft of the mobility device comprises a leg shaft. Each of the one or more couplers may comprise a first substantially annular component configured to engage the shaft of the mobility device and a second substantially annular component configured to engage the elongated body of the sheath. The open proximal end of the sheath may comprise a visual indicator. Additionally or alternatively, the open proximal end of the sheath may comprise a funnel-shaped configuration and/or the reaching apparatus comprises a flexible or semi-flexible shaft.

Additionally or alternatively, the stability assistance system may further comprise a reaching apparatus comprising an elongated shaft There, the reaching apparatus is coupled with the mobility device such that a user can couple and uncouple the reaching apparatus from the lumen of the sheath while concurrently using the mobility device for stability. In at least one embodiment, the reaching apparatus may further comprise a light.

Other embodiments of the present disclosure comprise a retrofit kit for mounting a reaching apparatus to a mobility device. In at least one of such embodiments, the kit comprises a sheath and one or more means of attachment for securely coupling the sheath to a shaft of a mobility device. The sheath comprises an elongated body having an open proximal end, a distal end, and a lumen in communication with at least the one open proximal end, where the lumen is configured to slidably receive at least part of a reaching apparatus therein. Furthermore, the one or more means of attachment may be selected from a group consisting of an adhesive, a mechanical fastener, a fabric hook and loop fastener, a cable tie, and a coupler. In certain embodiments, the sheath is configured to be mounted to an exterior surface of a leg shaft of a mobility device by one or more couplers.

Further embodiments of the kit may comprise a reaching apparatus comprising a shaft, one or more gripping components, a handle and a deployment mechanism. Here, the reaching apparatus is configured to grip and release an object with the one or more gripping components when the deployment mechanism is triggered and to be slidably received within the lumen of the sheath.

Still further, in at least one embodiment, the one or more means of attachment of the kit comprises at least two couplers comprising a first substantially annular component configured to engage a shaft of a mobility device and a second substantially annular component configured to engage the elongated body of the sheath. In certain examples, the first substantially annular component comprises a C-shaped configuration for receiving a shaft of a mobility device and the second substantially annular component comprises an enclosed ring-shape configuration for receiving the sheath. In other embodiments of the kit of the present disclosure, the first substantially annular component comprises an enclosed ring-shape configuration for slidably receiving a shaft of a mobility device and the second substantially annular component comprises a C-shaped configuration for receiving the sheath. Additionally, the one or more means of attachment may also comprise an adhesive capable of facilitating the attachment of the first substantially annular component to the shaft of a mobility device and the attachment of the second substantially annular component to the elongated body of the sheath.

In addition to the foregoing, the one or more means of attachment of the kits of the present disclosure may comprise at least one coupler extending from the sheath. There, the at least one coupler may comprise a first substantially annular component configured to engage a shaft of a mobility device (e.g., a leg shaft).

Methods of using a stability assistance device are also provided. In at least one exemplary embodiment, the method comprises the steps of: providing a sheath comprising an elongated body having an open proximal end, a distal end, and a lumen in communication with at least the one open proximal end, and a reaching apparatus slidably seated within the lumen of the sheath; and coupling the sheath with and adjacent to a shaft of a mobility device; wherein a user can concurrently use the mobility device for stability or mobility and slidably uncouple the reaching apparatus with the lumen of the sheath.

In at least one exemplary embodiment of the present disclosure, a stability system is provided comprising a mobility device having at least one shaft and a reaching apparatus configured to grip and release an object. The mobility device is configured to provide stability to an individual and, by way of non-limiting example, may comprise a cane, crutches, a walker, or the like. The reaching apparatus is coupled with the mobility device such that the individual using the mobility device can couple and uncouple the reaching apparatus from the mobility device while concurrently using the mobility device for stability. In this manner, an individual need not cease leaning on—or otherwise using—the underlying mobility device to access and/or utilize the reaching apparatus to grip an object.

The stability system disclosed herein may further comprise a sheath coupled with the mobility device. In at least one embodiment, the sheath comprises an elongated body having an open proximal end, a distal end, and a lumen. The lumen is in communication with at least the one open proximal end and configured to slidably receive at least part of the reaching apparatus therein. The distal end of the sheath may optionally comprise an open end and/or the proximal end of the sheath may comprise a funnel shaped configuration. Where the proximal end of the sheath comprises a funnel shaped configuration, in at least one exemplary embodiment of the system, at least a portion of the proximal end of the reaching apparatus comprises a tapered configuration that corresponds with the funnel shaped configuration of the proximal end of the sheath. In such embodiments, when the reaching apparatus is slidably received within the lumen of the sheath, the portion of the proximal end of the reaching apparatus comprising a tapered configuration can be securely seated within the funnel shaped proximal end of the sheath.

The sheath may be integrally formed on a portion of the mobility device or, alternatively, coupled therewith. In at least one embodiment of the stability system where the sheath is coupled with the mobility device, the sheath may comprise one or more couplers configured to attach the sheath to the mobility device. Such a coupler may comprise a first portion adapted to receive a portion of the mobility device therethrough and a second portion adapted to receive a portion of the sheath therethrough. Furthermore, in at least one embodiment, the first portion of each coupler comprises an enclosed, ring-shaped configuration and the second portion of each coupler comprises an open, C-shaped configuration.

The reaching apparatus of the stability system may further comprise a handle, a shaft, one or more gripping components, and a deployment mechanism. For example, the deployment mechanism of the reaching apparatus may comprise an actuator in mechanical communication with the one or more gripping components. Additionally or alternatively, the actuator may be configured to be triggered by depression such that depression of the actuator causes the one or more gripping components of the reaching apparatus to move from the first closed position to the second open position. Furthermore, in at least one exemplary embodiment, the shaft of the reaching apparatus is flexible or semi-flexible.

Stability assistance devices are also provided in the present disclosure. In at least one exemplary embodiment of a stability assistance device hereof, the device comprises a reaching apparatus comprising a shaft, one or more gripping components, a handle, and a deployment mechanism, and the reaching apparatus is configured to grip and release an object with the one or more gripping components when the deployment mechanism is triggered. Here, the reaching apparatus is also configured for slidable attachment to a mobility device such that the reaching apparatus may be securely coupled thereto, yet an individual can slidably remove the reaching apparatus from the mobility device while the individual is using the mobility device to assist with stability or mobility. For example, the mobility device may comprise a cane, crutches, a walker, or any similar device for providing stability and/or mobility assistance to a user.

The deployment mechanism of the reaching apparatus may comprise an actuator in mechanical communication with the one or more gripping components. Furthermore, the actuator may be configured to be triggered by depression. In such embodiments, depression of the actuator may cause the one or more gripping components to move from the first closed position to the second open position.

The stability device may further comprise a sheath configured to be coupled with the mobility device. In at least one embodiment, the sheath may comprise an elongated body having an open proximal end, a distal end, and a lumen in communication with at least the one open proximal end. The lumen is configured to slidably receive at least part of the reaching apparatus therein.

Additional embodiments of the stability device having a sheath may further comprise one or more couplers for facilitating the coupling of the sheath with the mobility device. In at least one exemplary embodiment, each of the couplers is configured to securely couple the sheath with the mobility device. By way of a non-limiting example, each coupler may comprise a first portion adapted to attach to the mobility device and a second portion adapted to attach to the elongated body of the sheath.

Methods for manufacturing the devices of the present disclosure are also provided. In at least one exemplary embodiment of the present disclosure, a method for manufacturing a stability assistance device comprises the steps of: providing a mobility device having at least one shaft, the mobility device configured to provide stability to an individual; providing a reaching apparatus configured to grip and release an object; and removably coupling the reaching apparatus with the at least one shaft of the mobility device such that an individual can couple and uncouple the reaching apparatus from the mobility device while concurrently using the mobility device for stability or mobility.

Figure 1:
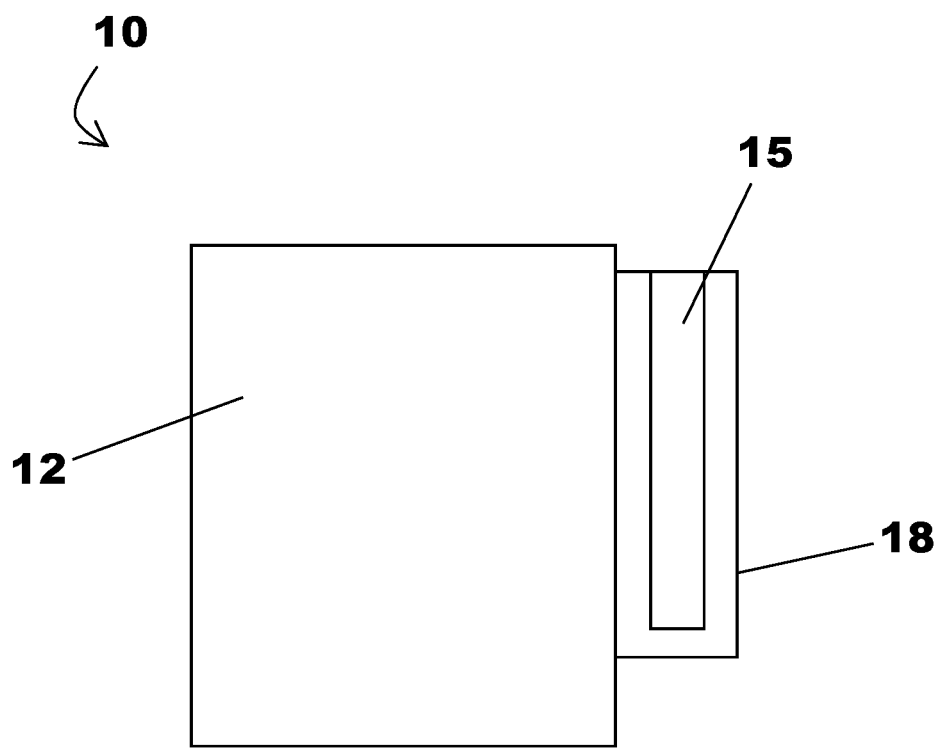
FIG. 1 is a schematic view of an exemplary mobility and reaching system of the present disclosure.

An overview of the features, functions and/or configurations of the components depicted in the various figures will now be presented. It should be appreciated that not all of the features of the components of the figures are necessarily described. Some of these non-discussed features, such as various couplers, etc., as well as other discussed features are inherent from the figures themselves. Other non-discussed features may be inherent in component geometry and/or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended, with any additional alterations, modifications and further applications of the principles of this disclosure being contemplated hereby as would normally occur to one skilled in the art.

The disclosure of the present application provides novel devices and systems for combining mobility assistance with a reaching aid. Unlike conventional devices and systems, the devices and systems hereof are capable of providing both mobility assistance and the use of a reaching aid concurrently. Furthermore, the devices and systems hereof are durable and easy to use such that limited dexterity and/or a small amount of force is required to access and utilize the functionality thereof. Because of these unique and advantageous properties, and as will be described herein in further detail, the devices and systems of the present disclosure are particularly well suited for individuals having limited or impaired mobility and especially those individuals who have a limited ability to grip and/or apply force with their hands.

Referring now to FIG. 1, a schematic view of a mobility and reaching system 10 of the present disclosure is shown. Mobility and reaching system 10 comprises a mobility device 12 removably coupled with a reaching apparatus 15 via a sheath 18 or as otherwise described herein. The reaching apparatus 15 is secured to the mobility device 12 of the system 10 such that a user can conveniently carry the reaching apparatus 15 as they move about, yet also easily disengage and use the reaching apparatus 15 without interrupting his or her use of the mobility device 12 for balance and/or support. The various components of the system 10 will first be generally described with reference to FIG. 1, followed by more detailed and embodiment-specific descriptions in conjunction with the remaining Figures of the disclosure.

The mobility device 12 of the mobility and reaching system 10 may comprise any type device that facilitates a user's balance, stability and/or mobility. For example, in at least one embodiment, the mobility device 12 comprises a cane, crutches or a walker (standard, rolling, etc.). Additionally, the mobility device 12 may comprise a wheelchair (motorized or otherwise). Generally speaking, and without any intended limitation, most mobility devices 12 comprise at least one leg shaft or other elongated surface that provides one or more points to which the reaching apparatus 15 (or, where the reaching apparatus 15 is coupled with the device 12 through indirect means, any associated sheath 18) may attach.

Depending on user preference and/or the intended application of the mobility and reaching system 10, the reaching apparatus 15 may be mounted to whichever surface(s) minimize the sheath's 18 and/or reaching apparatus' 15 appearance or so as not inhibit use of the mobility device 12. Furthermore, it is contemplated that the length of the leg shaft(s) of the mobility device 12 may be adjustable such that its dimensions can be customized pursuant to user preferences/needs. Perhaps more specifically, the leg shaft of the mobility device 12 may be configured for incremental lengthening or shortening as is known in the art either through the use of a telescoping mechanism that is released or locked through the use of a series of spring-released latches or otherwise (see FIG. 3). In light of this, in at least one embodiment, the exact placement of the reaching apparatus 15 and/or shaft 18 on the mobility device 12 may also be adjusted and/or modified to take into account any user-specific mobility device 12 adjustments. In this manner, it can be ensured that the reaching apparatus 15 is in a location that is easily accessible by the user (ideally with one hand).

Now referring to the reaching apparatus 15 of the system 10, the reaching apparatus 15 comprises a device for aiding a user by extending their reaching and/or gripping abilities. For example, the reaching apparatus 15 may comprise a grabbing device configured to retrieve items that are otherwise difficult for a user to reach and/or retrieve. Such a reaching apparatus 15 generally comprises an elongated shaft having a handle at its proximal end, a gripping component at its distal end, and a deployment mechanism linked by a cable, a shaft, or other connecting means to the gripping component.

Figure 2A:
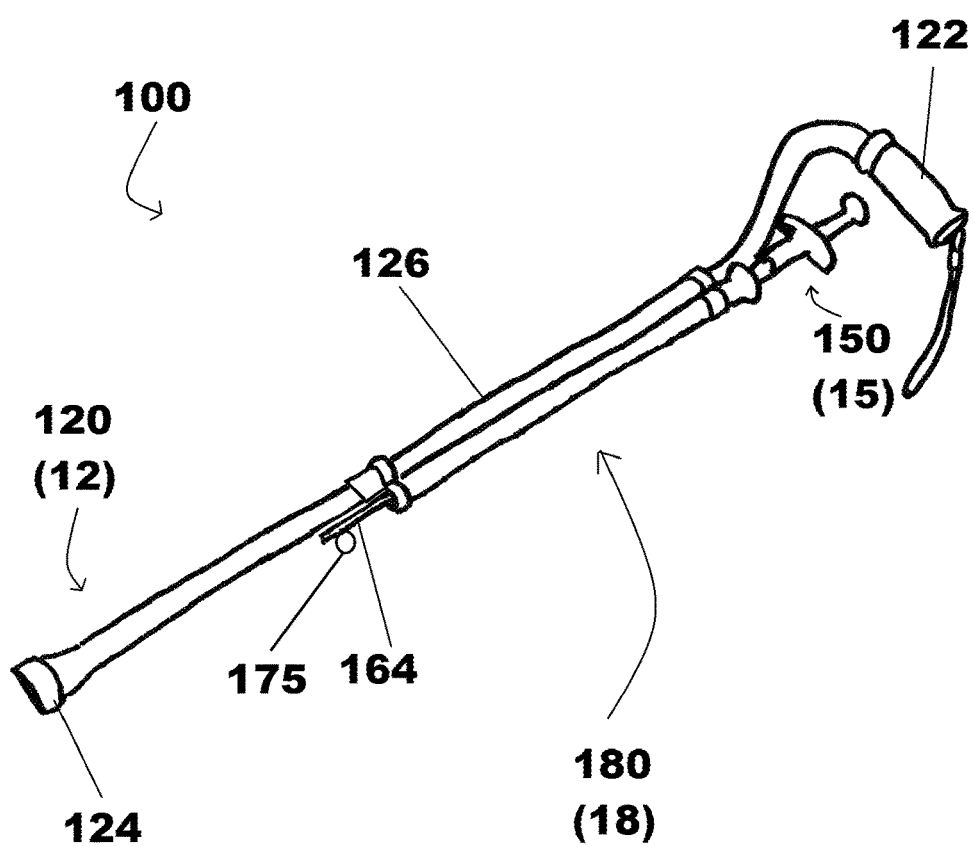
FIGS. 2A and 2B show side views of an exemplary mobility and reaching system of the present disclosure.

In at least one embodiment, the reaching apparatus 15 may additionally comprise a light 175 (and its related electronic componentry and power source as are known in the art) to assist a user in locating and/or retrieving an item with the gripping component). FIG. 2A shows the light 175 positioned on a distal portion of the reaching apparatus 15 at or near the gripping component; however, it will be appreciated the light 175 may be positioned in any location conducive to providing light at or near the distal end of the reaching apparatus 15. The switch for the light 175 may be coupled with or adjacent to the deployment mechanism, or positioned on any other portion of the reaching apparatus 15.

The reaching apparatus 15 may be constructed of metal, plastic, or other suitable materials (or using a combination thereof) and may be flexible, semi-flexible or rigid, depending on the preferred application. In at least one embodiment, the elongated shaft of the reaching apparatus 15 comprises a woven metal coil housing and is semi-flexible such that while it is capable of being formed into a particular configuration, it is also capable of substantially maintaining the predefined shape. Moreover, the dimensions of the reaching apparatus 15 may be customized pursuant to user preference and/or the desired application. For example, the length of the reaching apparatus 15 can be customized to fit a particular mobility device 12 and/or facilitate ease of use by an individual. Additionally or alternatively, the deployment mechanism can be customized and/or adjusted to modify the amount of force required to deploy the gripping component thereof, which is particularly useful for those individuals with a limited ability to grip and/or apply force with their hands.

In operation, a user can remove the reaching apparatus 15 from the mobility device 12 and utilize the reaching apparatus 15 to securely grasp or grip an object that is otherwise out of his or her immediate reach. As previously noted, a reaching apparatus 15 generally comprises an elongated shaft having a handle, a gripping component, a deployment mechanism, and, optionally, a light 175. The elongated shaft increases the user's reach and, when the deployment mechanism of the reaching apparatus 15 is actuated or triggered, the gripping components are moved toward each other and, thus, configured to grasp a targeted object in the vicinity thereof. Furthermore, the light 175 may be used to provide a light source/illumination to facilitate locating a targeted object and grasping the same with the gripping components. In at least one exemplary embodiment, the switch (not shown) of the light 175 is coupled with the deployment mechanism such that actuation of the deployment mechanism of the reaching apparatus also illuminates the light 175 (i.e. switches the light on) and release of the deployment mechanism switches off the light 175.

After the gripping components are locked in place around the targeted object (either by continued activation of the actuator or through a locking mechanism), the user can use the reaching apparatus 15 to maneuver the object. While specific embodiments of the reaching apparatus 15 are described in detail herein, it will be appreciated that the reaching apparatus 15 may comprise any reaching and/or grabbing device now known or hereinafter developed, provided the reaching apparatus 15 can be securely coupled with, connected to, and/or seated within the mobility device 12 as described herein, and thereafter easily accessed and removed by a user.

Due to the configuration of the system 10, a user can access and use the reaching apparatus 15 while continuing to use the mobility device 12 as intended (i.e. provide support, stability and/or facilitate balance). This is, at least in part, due to the manner in which the reaching apparatus 15 is attached to the mobility device 12. As previously noted, the reaching apparatus 15 is removably coupled with, connected to and/or seated in the mobility device 12 such that the reaching apparatus 15 is easy for a user to access and securely store. In at least one embodiment, the reaching apparatus 15 is directly connected to or coupled with the mobility device 12 such that it can be securely attached and easily removed from the mobility device 12 by a user (e.g., through the use of a mechanical fastener, a fabric hook and loop fastener, cable or tie wrap(s), or the like) (not shown). Alternatively, as shown in FIG. 1, a sheath 18 may be employed to connect or couple the reaching apparatus 15 with the mobility device 12. In those embodiments comprising a sheath 18, the sheath 18 may either comprise a separate component that is secured to the mobility device 12 (such as, for example, through the use of adhesive, cable or tie wrap(s), a mechanical fastener, and/or one or more couplers 186 as described below), or be formed as an integral part thereof when the mobility device 12 is manufactured (not shown).

Figure 2B:
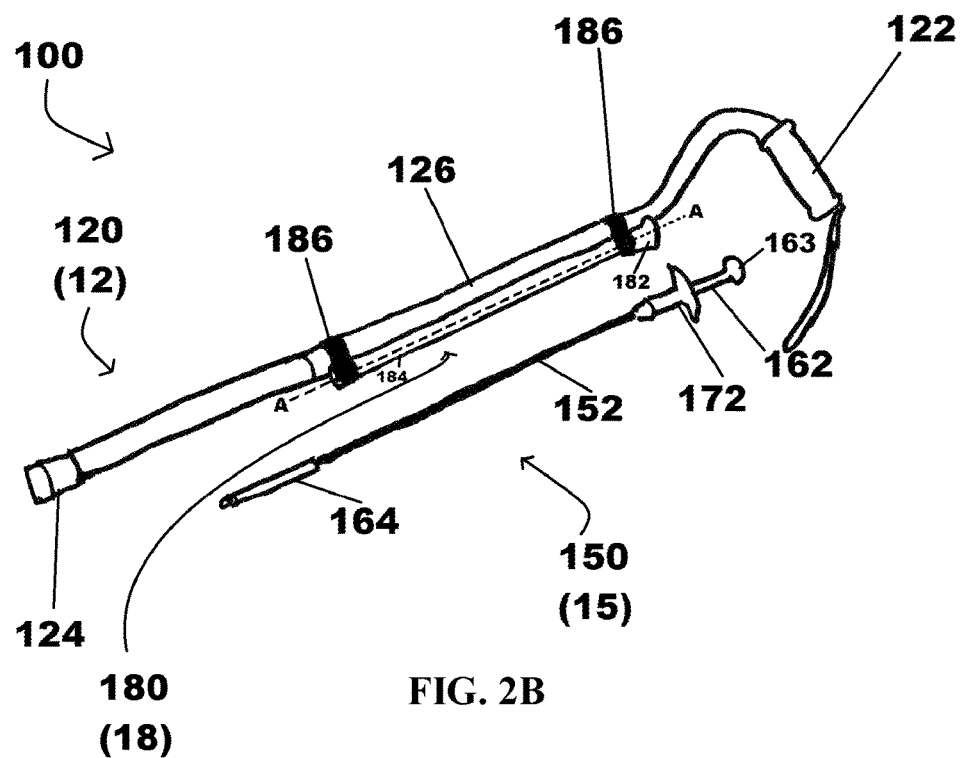

Referring now to FIGS. 2A and 2B, side views of an exemplary embodiment of a mobility and reaching system 100 are shown. Similar to the previously described mobility and reaching system 10, system 100 comprises a mobility device 12 having a reaching apparatus 15 slidably coupled therewith via a sheath 18.

Figure 3:
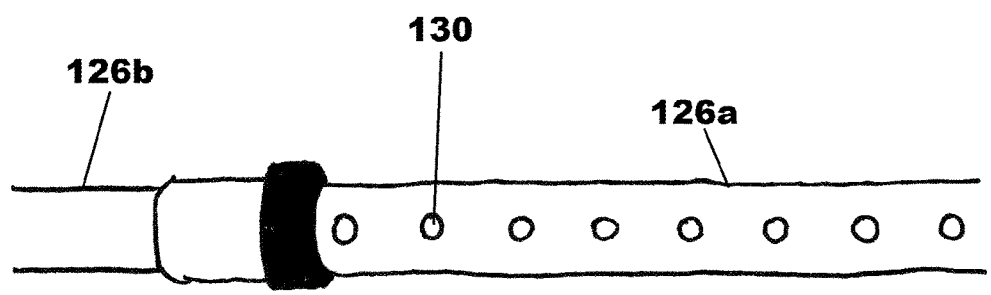
FIG. 3 shows a side view of a portion of an adjustable length mobility device of the exemplary mobility and reaching system of FIGS. 2A and 2B.

The mobility device 12 of system 100 comprises a cane 120 having a handle 122 proximally, a ferrule 124 distally, and a shaft 126 configured to transmit a load from the handle 122 on its proximal end to the ferrule 124 of its distal end. Furthermore, as shown in FIG. 3, the shaft 126 of the cane 120 comprises more than one piece (e.g., proximal shaft 126*a* and distal shaft 126*b*) and a spring-loaded locking mechanism 130 such that a user can adjust the length of the shaft 126 as desired. While the cane 120 and its components are shown as having particular configurations, it will be appreciated that the cane 120 may be any type of cane now known or hereinafter developed such as, for example, a folding cane, a quad cane (having four ferrules), a forearm cane, or a simple wooden cane.

Now referring back to FIG. 2B, the reaching apparatus 15 of the mobility and reaching system 100 comprises a grabber 150 for reaching for and grabbing objects that are out of the user's immediate reach. In operation, the grabber 150 may be withdrawn from the mobility device 120 and/or sheath 180 (as applicable) and used to engage and retrieve objects that are out of a user's reach. In an exemplary embodiment, the system 100 is configured such that a user need only use one hand to withdraw the grabber 150, operate the grabber 150 to retrieve/grab and object, and re-couple the grabber 150 with the mobility device 120.

In at least one embodiment, the grabber 150 comprises an elongated shaft 152 having a handle 163 at its proximal end 162, an opening at its distal end 164, and a lumen (not shown) extending therebetween. The grabber 150 may optionally also comprise a light positioned thereon (not shown). The handle 163 may be coupled with or integral to the proximal end 162 of the shaft 152 and is configured to facilitate manipulation of the grabber 150. The elongated shaft 152 may be constructed of metal, plastic, or other suitable materials (or combinations thereof), and may be rigid, flexible or semi-flexible as desired. In at least one exemplary embodiment, the elongated shaft 152 comprises a woven metal coil housing such that it has some degree of flexibility.

Figure 4:
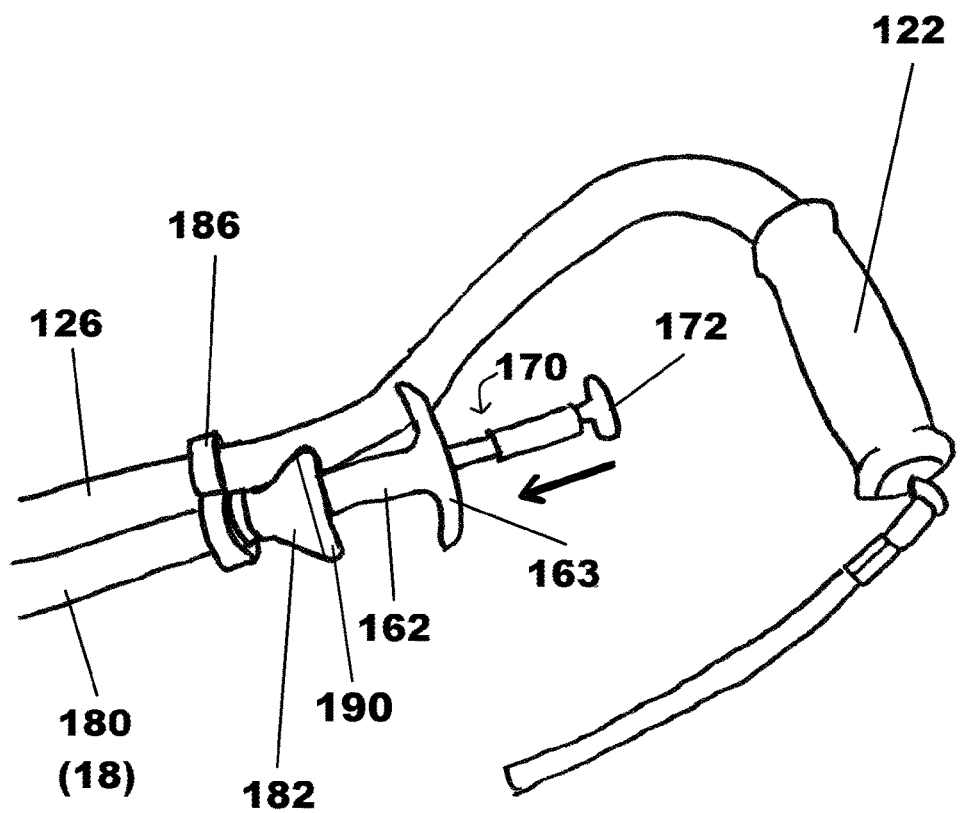
FIG. 4 shows a side view of one end of the exemplary mobility and reaching system of FIGS. 2A and 2B.

A deployment mechanism 170 is slidably housed at least partially within the lumen of the elongated shaft 152 and comprises a proximal end 172 having an actuator, a distal end 174 having two or more gripping components, and a cable, pulley, shaft, rod or other linking component connecting the proximal and distal ends 172, 174 of the deployment mechanism 170. As shown in FIGS. 2B and 4, the proximal end 172 (i.e. actuator) of the deployment mechanism 170 extends from the proximal end 162 of the elongated shaft 152. In embodiments comprising a light 175, the switch of the light 175 may be coupled with the actuator and the electronic componentry and/or power source (e.g., a battery) may be at least partially housed within the lumen of the elongated shaft 152. The electronic componentry and power source (or connection therefore) of the light 175 may comprise any known in the art or hereinafter developed suitable for coupling with the reaching apparatus 150.

The distal end 174 of the deployment mechanism 170 is positioned at or near the distal end 164 of the elongated shaft 152 and comprises two or more gripping components. The gripping components may comprise any configuration that is capable of engaging and holding onto an object when deployed. For example, in at least one exemplary embodiment, the gripping components may comprise a plurality of wires formed in a claw-like configuration (see FIG. 6B). Additional, non-limiting examples of the gripping component configuration may further comprise two or more grabbing fingers, a scissor-like design, a series of hooks, and the like. Furthermore, additional embodiments of the gripping component may optionally include grasp enhancing materials and/or features to provide an improved or strengthened grip (such as, for example, magnets, textured grips, one or more tacky surfaces, etc.).

Figure 5:
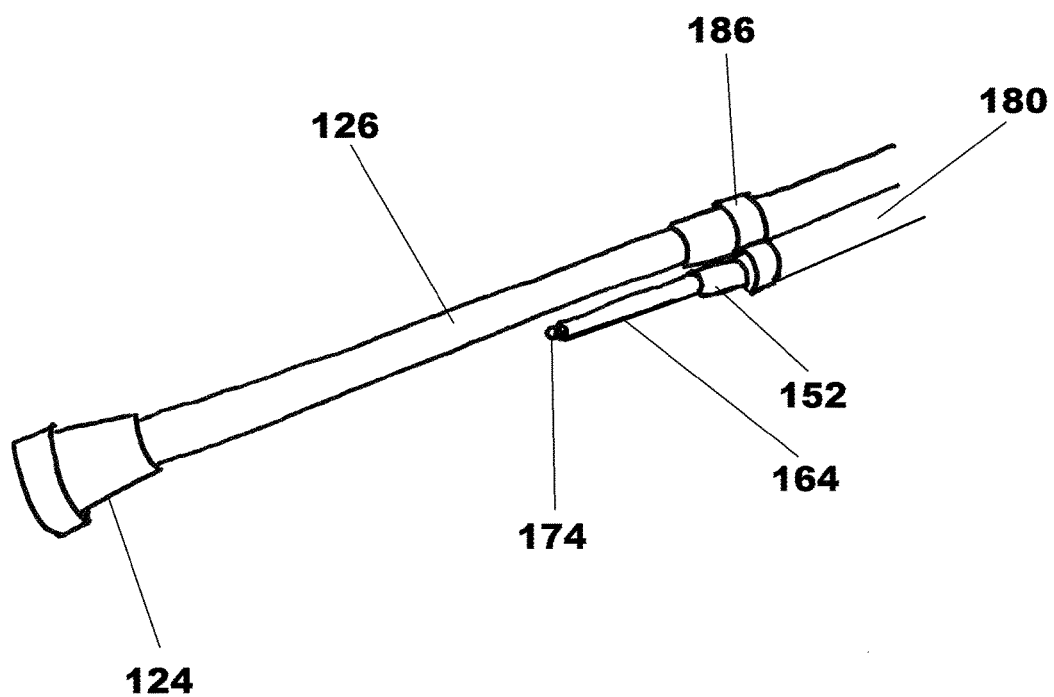
FIG. 5 shows a side view of the other end of the exemplary mobility and reaching system of FIGS. 2A and 2B.
Figure 6A:
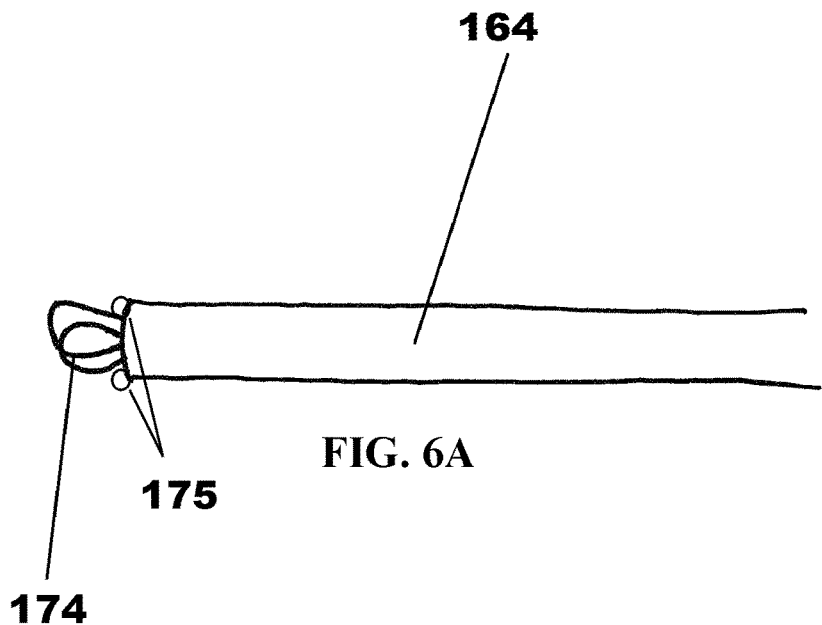
FIGS. 6A and 6B show side views of gripping components of a reaching device of the exemplary mobility and reaching system of FIGS. 2A and 2B, where the gripping components are in both a closed configuration (FIG. 6A) and an open configuration (FIG. 6B)
Figure 6B:
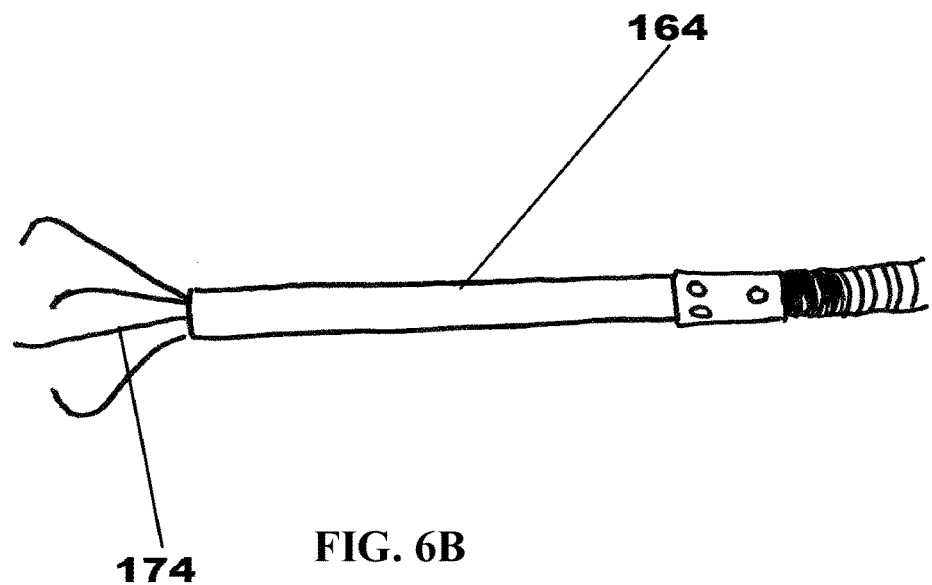

As shown in FIGS. 5-6B, the gripping components of the deployment mechanism 170 are movable between a first closed configuration (see FIGS. 5 and 6A) and a second open configuration (see FIG. 6B). In at least one embodiment, when the gripping components are in the first closed configuration, they may be entirely or partially housed within the lumen of the elongated shaft 152. Alternatively, the gripping components of the deployment mechanism 170 may be positioned outside of the distal open end 164 of the elongated shaft 152 (such as, for example, where the gripping components comprise a C-shaped or other configuration that does not fit within the lumen of the elongated shaft 152).

The actuator of the deployment mechanism 170 is configured to deploy the gripping components of the grabber 150 when triggered by a user. Perhaps more specifically, triggering the actuator of the proximal end 172 of the deployment mechanism 170 moves the gripping components from the first collapsed configuration to the second open configuration. The actuator may comprise a depressible button, a squeezable lever, or any other configuration capable of initiating the movement of the gripping components from the first collapsed configuration to the second open configuration.

The gripping components may be held in the second open configuration until the actuator is released (i.e. no longer engaged), or the deployment mechanism 170 may further comprise a locking mechanism (not shown) capable of maintaining the gripping components in second open configuration until the user initiates movement back to the first closed configuration. Accordingly, in the exemplary embodiment shown in FIG. 4, pushing the actuator of the deployment mechanism 170 in the direction of the arrow causes the gripping components of the distal end 174 of the deployment mechanism 170 to move from the first collapsed configuration (see FIG. 6A) to the second open configuration (see FIG. 6B).

As previously noted, the reaching apparatus 15 may be coupled with, connected to or seated within the mobility device 12 either directly or indirectly. The embodiments of the system 100 shown in FIGS. 2A and 2B illustrate an example of a reaching apparatus 150 that is coupled with the mobility device 12 through an indirect attachment. Here, the mobility and reaching system 100 further comprises a sheath 180 having an elongated body that is, at least partially, hollow. The hollow interior of the elongated sheath 180 is configured such that it is capable of easily and securely receiving at least most of the elongated shaft 152 of the grabber 150. The diameter of the hollow interior of the sheath 180 may be consistent along the length thereof or, such as where the grabber 150 of the system 100 comprises a tapered configuration along its length, the hollow interior of the sheath 180 and/or the sheath 180 itself may also comprise a corresponding tapered configuration. Accordingly, the sheath 180 forms a channel into which the grabber 150 may be slidably received.

As shown in FIGS. 2B and 7A-7C, sheath 180 further comprises a proximal end 182 and a distal end 184. While the proximal end 182 of the sheath 180 is open and configured to slidably receive at least a portion of the grabber 150 therein, the distal end 184 may be open or closed. In the embodiments shown in FIGS. 2A and 2B, the distal end 184 of the sheath 180 is open such that when the grabber 150 is positioned within the sheath 180, the distal end 164 of the grabber 150 extends beyond the distal end 184 of the sheath 180.

Figure 7A:
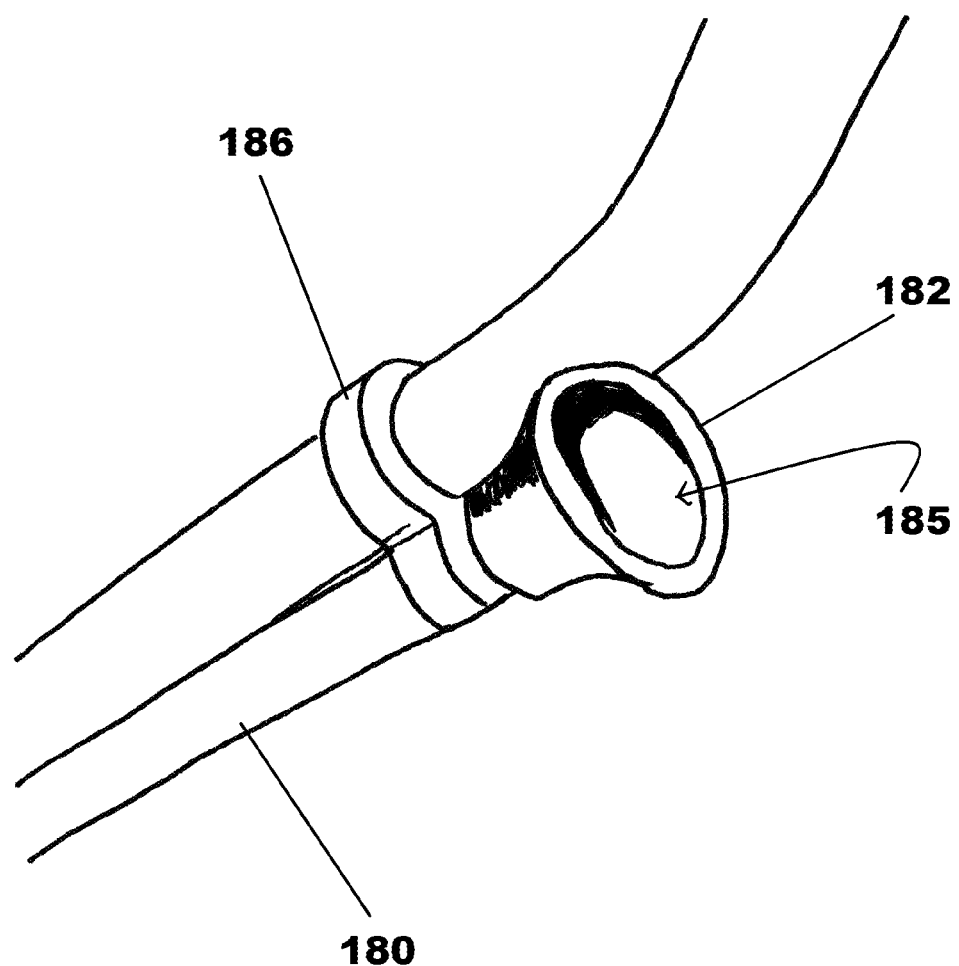
FIGS. 7A-7C show perspective, side and bottom views, respectively, of a proximal end of a sheath of the exemplary mobility and reaching system of FIGS. 2A and 2B.
Figure 7B:
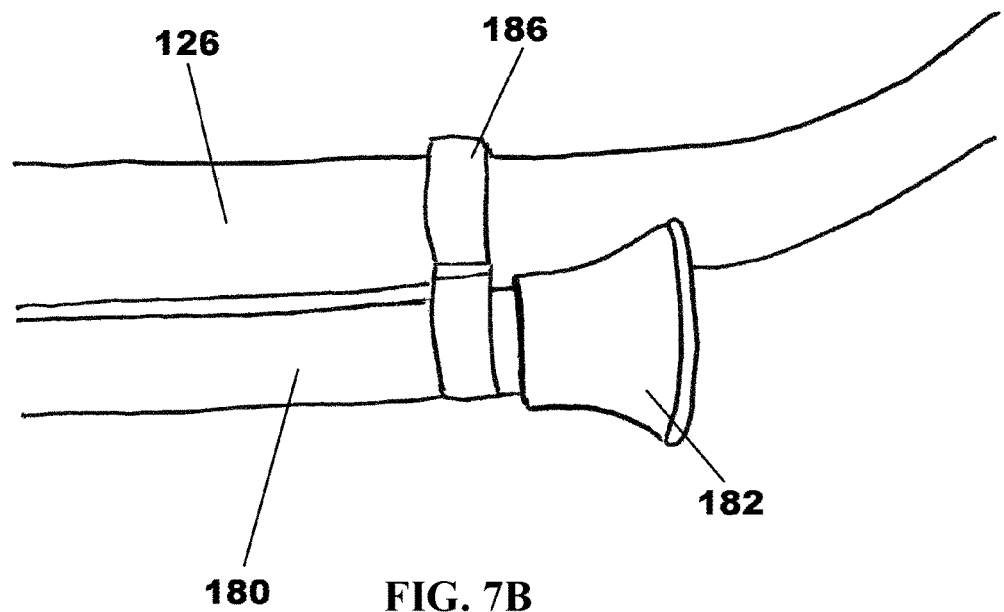
Figure 7C:
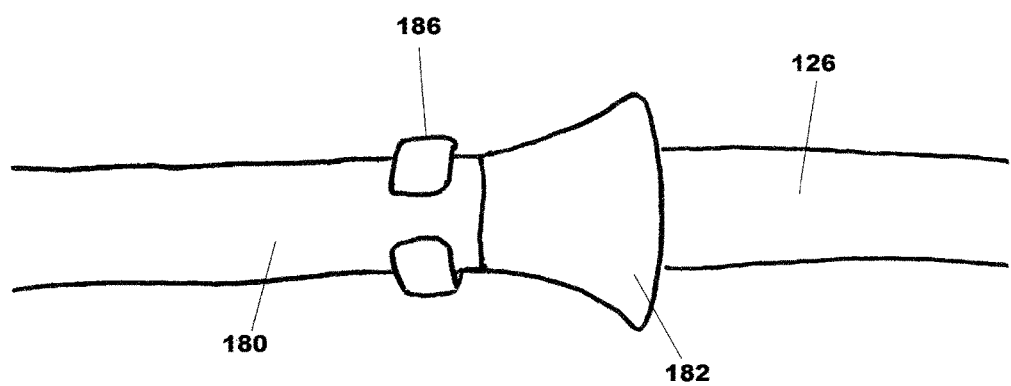

As previously noted, the proximal end 182 of the sheath 180 is open and in communication with the hollow interior of the sheath 180. As shown in FIGS. 7A-7C, in at least one embodiment, the proximal end 182 of the sheath 180 may additionally comprise a funnel-shaped configuration. The funnel-shaped configuration provides a larger target into which a user can insert the distal end 164 of the grabber 150 when returning the grabber 150 to the sheath 180. Especially when shaft 152 of the reaching apparatus 150 is flexible or semi-flexible, the funnel-shaped configuration allows for a user to insert and withdraw the reaching apparatus 150 into the sheath 180 at an angle.

Furthermore, in at least one embodiment, the proximal end 162 of the grabber 150 may additionally comprise a tapered configuration that corresponds with the taper of the funnel-shaped proximal end 182 of the sheath 180. Such corresponding configuration facilitates a secure and precise fit between the sheath 180 and the grabber 150 when the two components are fully engaged. Moreover, where the sheath 180 comprises an open distal end 184, the proximal end 182 having a funnel configuration prevents the grabber 150 from sliding too far into the sheath 180. In this manner, the grabber 150 remains secure and readily accessible to a user when it is housed within the sheath 180 of the system 100.

The proximal end 182 of the sheath 180 may optionally comprise an indicator 190. The indicator 190 may be visible and draw the eye so that a user can easily locate where to insert the grabber 150 into the sheath 180. In at least one exemplary embodiment, the indicator 190 comprises an area of fluorescent color that contrasts with the underlying color of the sheath 180; however, it will be appreciated that any type of visual or other (e.g., tactile) indicator may be employed to facilitate the identification of the proximal end 182 of the sheath 180.

As previously noted, the sheath 180 may be separate from the mobility device 12 and simply coupled therewith, or the sheath 180 may be an integrally formed aspect of the mobility device 12 itself. Where the sheath 180 is a separate component of the system 100, it may be coupled with and/or attached to the mobility device 12 in a variety of ways (including, for example, through the use of an adhesive, mechanical fastener(s), a fabric hook and loop fastener(s), cable or tie wrap(s), and/or the like).

In at least one embodiment, the sheath 180 is a separate component that is non-removably connected to or coupled with the mobility device 12 via one or more couplers 186.

The couplers 186 may be formed as part of the sheath 180 or configured as separate components of the system 100 as shown in FIGS. 2A and 2B. Each of the couplers 186 are configured to be securely attached to the mobility device 12. While specific examples are provided herein, any coupler 186 configurations or combinations thereof can be employed with the system 100, provided the sheath 180 can be firmly secured to the cane 120.

In the embodiments of FIGS. 2A, 2B and 7A-7C, each coupler 186 comprises two substantially annular components—one configured to engage the leg shaft of the cane 120 and one configured to engage the elongated body of the sheath 180. As can be seen in FIG. 7C, each substantially annular component of a coupler 186 may comprise either an enclosed ring-shape or a C-shape. Where one or more of the annular components of a coupler 186 comprises a C-shaped configuration, any system 100 component disposed therein (e.g., the shaft 126 of the cane 120 or the elongated body of the sheath 180) can be removed therefrom (i.e. popped out). Alternatively, where the substantially annular components of a coupler 186 comprise an enclosed ring-shape, the system 100 component disposed therein may not be easily removed. In the at least one embodiment of FIG. 7C, each of the couplers 186 comprises a first annular component having an enclosed ring-shape for receiving the shaft 126 of the cane 120 and a second annular component having a C-shaped configuration for receiving the elongated body of the sheath 180.

In an alternative embodiment, both the first and second annular components of a coupler 186 comprise an enclosed ring-shape configuration such that, once the coupler 186 is attached to the underlying components, it is not easily removed. Indeed, in at least one exemplary embodiment, the couplers 186 are configured such that the sheath 180 is non-removably coupled with the mobility device 12 via the couplers 186 such that the sheath 180 will not slip or change positions when the user uses the mobility device 12 to ambulate, folds up or otherwise stores the mobility device 12 when it is not in use, or when the sheath 180 is subjected to the force of a user inserting or withdrawing the reaching apparatus 150 therefrom. Where permanent attachment is desired between the sheath 180 and the mobility device 12, additional types of coupling means may also be used in addition to the couplers 186 (such as, for example, adhesives).

It will be appreciated that the specific shape and dimensions of each coupler 186 will be dependent upon the configuration of the underlying mobility device 12 of the system 100. Indeed, the couplers 186 may be constructed in a variety of shapes and sizes to accommodate the shape(s) of those portions of the mobility device 12 to which the sheath 180 is attached. Furthermore, the couplers 186 may be positioned along the mobility device 12 so as to form an elongated channel configured to receive the elongated body of the sheath 180 therein. For example, as shown in FIG. 2B, the couplers 186 are positioned along the shaft 126 of the cane 120 so as to form an elongated channel having an axis along line A-A.

The mobility and reaching aid devices and systems of the present disclosure provide a user with both mobility assistance and the use of a reaching aid concurrently. For example, in operation, a user can lean on the cane 120 for support while concurrently slidably removing the grabber 150 from the sheath 180 and using the same to grab an object out of his or her comfortable reach. Even further, due to the configuration of the system 100, a user need only use one hand in accessing, removing and/or utilizing the grabber 150. Additionally or alternatively, the grabber 150 (i.e. reaching apparatus 15) may be specially configured to limit the dexterity and/or force required in accessing and utilizing the features and functionality thereof. In this manner, not only do the devices and systems hereof provide users with both mobility assistance and the use of a convenient reaching aid, but they are also particularly well suited for those individuals that have a limited ability to grip and/or apply force with their hands.

The devices and systems described herein can be delivered by providing necessary materials in kit form. For example, kits may be provided for retrofitting a user's mobility device 12. In at least one embodiment, such a kit may comprise the sheath 180 and one or more means of attachment for securing (removably or permanently) the sheath to a shaft of the user's mobility device. There, in at least one embodiment, the sheath 180 may be specifically configured to mate (or otherwise couple) with a targeted shaft of the mobility device 12.

The one or more means of attachment may comprise adhesive(s), mechanical fastener(s), fabric hook and loop fastener(s), cable tie(s), and/or coupler(s). Additionally, a kit may comprise a reaching apparatus configured to be slidably received within the lumen of the sheath and/or at least one indicator for positioning on the proximal end of the sheath 180.

Methods for the manufacture of the devices and systems described herein are relatively straightforward. In at least one embodiment, a retrofit method may comprise the steps of using a mobility and/or stabilization device (MSD) known in the medical arts that was previously manufactured in accordance with known techniques, and retrofitting such MSD with a reaching apparatus 15 and/or sheath 18 (using couplers 186 or otherwise). Placement and attachment of the reaching apparatus 15 on or with the MSD may be in any manner provided an individual can couple and uncouple the reaching apparatus from the MSD while concurrently using the MSD for stability and/or mobility.

For example, in at least one embodiment of a retrofit method of manufacture of the present disclosure, a reaching apparatus 15 is removably mounted to a surface of a conventional cane through the use of couplers 186, clips, hook and loop fastener(s), and/or the like. Alternatively, a sheath 18 configured to receive the reaching apparatus 15 may be removably mounted to a cane or walker using similar couplers 186/fasteners. In at least one exemplary example, placement of the reaching apparatus 15 or sheath 18 on the conventional cane is along the shaft of the cane. However, with other types of MSDs, it will be appreciated that the reaching apparatus 15/sheath 18 could be mounted in any location that is conducive to a user accessing the reaching apparatus 15 while concurrently using the MSD for support (e.g., such as to a leg shaft of a walker).

Alternatively, a method for manufacturing the devices and systems of the present disclosure may entail manufacturing MSDs having a seat or coupling component integrally formed into a portion thereof. In such embodiments, the seat or coupling component of the MSD is configured to couple with and/or receive the reaching apparatus 15 or the sheath 18 of the device 10 (for example and without limitation, couplers 186 may be formed directly on an elongated shaft of an MSD (not retrofit)). Accordingly, the MSD may be manufactured specifically to receive/couple with a reaching apparatus 15 and/or sheath 18. Still further, other embodiments of the method may comprise the step of manufacturing a MSD having a sheath 18 integrally formed within a component thereof (for example, an elongated component of the MSD may be configured to form a sheath 18 for receiving the reaching apparatus 15). Similar to the previously described methods of manufacture, the placement of where the sheath 18 and/or components 186 are formed on the MSD may be in any location provided an individual can securely couple and easily uncouple the reaching apparatus from the MSD while concurrently using the MSD for stability and/or mobility.

While embodiments of mobility and reaching aid devices and systems have been described in considerable detail herein, the embodiments are merely offered by way of non-limiting examples. It will therefore be understood that various changes and modifications may be made, and equivalents may be substituted for elements thereof, without departing from the scope of the disclosure. Indeed, this disclosure is not intended to be exhaustive or to limit the scope of the disclosure.

The invention claimed is:

1. A stability assistance system comprising:
   a mobility device comprising a shaft;
   a sheath coupled with the shaft of the mobility device via one or more couplers comprising at least one annular component such that the sheath is positioned adjacent to the shaft, the sheath comprising an elongated body having an open proximal end, a distal end, and a lumen in communication with at least the one open proximal end, the lumen configured to slidably receive at least part of a reaching apparatus therein; and
   a reaching apparatus comprising an elongated shaft, the reaching apparatus configured to grip an object and to be slidably received within or removed from the lumen of the sheath by a user while concurrently using the mobility device for stability.

2. The stability assistance system of claim 1, wherein the one or more couplers are integrally formed on the shaft of the mobility device.

3. The stability assistance system of claim 1, wherein the shaft of the mobility device comprises a leg shaft.

4. The stability assistance system of claim 1, wherein the sheath is further coupled with the shaft of the mobility device by an adhesive.

5. The stability assistance system of claim 4, wherein the at least one annular component of each of the one or more couplers comprises a first substantially annular component configured to engage the shaft of the mobility device and a second substantially annular component configured to engage the elongated body of the sheath.

6. The stability assistance system of claim 1, wherein the one or more couplers each comprise a mechanical fastener for securing the coupler around the shaft of the mobility device.

7. The stability assistance system of claim 1, wherein the reaching apparatus further comprises a light.

8. The stability assistance system of claim 1, wherein the open proximal end of the sheath comprises a funnel-shaped configuration and an indicator positioned thereon.

9. The stability assistance system of claim 1, wherein the open proximal end of the sheath comprises a funnel-shaped configuration and the reaching apparatus comprises a flexible or semi-flexible shaft.

10. A system for mounting a reaching apparatus to a mobility device, the system comprising:
    a sheath comprising an elongated body having an open proximal end, a distal end, and a lumen in communication with at least the open proximal end, the lumen configured to slidably receive at least part of a reaching apparatus therein;
    one or more means of attachment for securely coupling the sheath to a shaft of a mobility device such that the sheath is positioned adjacent to the shaft, the one or more means of attachment comprising at least one annular component; and
    a reaching apparatus comprising a shaft, one or more gripping components, a handle, and a deployment mechanism, wherein the reaching apparatus is configured to grip or release an object with the one or more gripping components when the deployment mechanism is triggered and to be slidably received within the lumen of the sheath.

11. The system of claim 10, wherein the at least one annular component of the one or more means of attachment comprises at least two couplers, each coupler comprising a first substantially annular component configured to engage a shaft of a mobility device and a second substantially annular component configured to engage the elongated body of the sheath.

12. The system of claim 11, wherein the one or more means of attachment comprises an adhesive capable of facilitating attachment of the first substantially annular component of each coupler to the shaft of a mobility device and the second substantially annular component of each coupler to the elongated body of the sheath.

13. The system of claim 11, wherein at least one of the first substantially annular component and the second substantially annular component of each coupler comprises a C-shaped configuration.

14. The system of claim 11, wherein the first substantially annular component of each coupler comprises an enclosed ring-shape configuration for slidably receiving a shaft of a mobility device and the second substantially annular component of each coupler comprises a C-shaped configuration for receiving the sheath.

15. The system of claim 10, wherein each of the one or more means of attachment comprising at least one annular component comprises at least one coupler extending from the sheath, the at least one coupler comprising a first substantially annular component configured to engage a shaft of a mobility device.

16. The system of claim 15, wherein the shaft of the mobility device comprises a leg shaft.

17. The system of claim 10, wherein the sheath is configured to be mounted to an exterior surface of a leg shaft of a mobility device by the one or more means of attachment.

18. A method of using stability assistance device comprising the steps of:
    providing a sheath comprising an elongated body having an open proximal end, a distal end, and a lumen in communication with at least the one open proximal end, and a reaching apparatus comprising a shaft, one or more gripping components, a handle, and a deployment mechanism, the reaching apparatus configured to grip or release an object with the one or more gripping components when the deployment mechanism is triggered and to be slidably seated within the lumen of the sheath; and
    coupling the sheath with a shaft of a mobility device via one or more couplers comprising at least one annular component such that the sheath is positioned adjacent to the shaft;
    wherein a user can concurrently use the mobility device for stability or mobility and slidably uncouple the reaching apparatus with the lumen of the sheath.

* * * * *